United States Patent [19]

Frantz

[11] 4,196,261

[45] Apr. 1, 1980

[54] STABLE BIMETAL STRIP

[75] Inventor: Earl L. Frantz, Reading, Pa.

[73] Assignee: Carpenter Technology Corporation, Reading, Pa.

[21] Appl. No.: 952,794

[22] Filed: Oct. 19, 1978

Related U.S. Application Data

[63] Continuation of Ser. No. 873,619, Jan. 30, 1978, abandoned.

[51] Int. Cl.² .............................................. B32B 15/18
[52] U.S. Cl. ................................. 428/616; 75/123 N; 75/123 K; 428/619
[58] Field of Search ................ 75/122, 123 N, 123 K, 75/134 N, 134 F, 128 A, 128 C, 128 B; 148/38; 428/616, 617, 618, 619, 685

[56] References Cited

U.S. PATENT DOCUMENTS

| | | | |
|---|---|---|---|
| 1,803,467 | 5/1931 | Driver et al. | 75/128 A |
| 2,133,291 | 10/1938 | Gordon | 75/122 |
| 3,266,876 | 8/1966 | DeLong | 75/123 K |
| 4,060,429 | 11/1977 | Dean et al. | 75/134 F |

FOREIGN PATENT DOCUMENTS 258606  8/1968  U.S.S.R. ................. 75/123 N

Primary Examiner—Arthur J. Steiner
Attorney, Agent, or Firm—Edgar N. Jay

[57] ABSTRACT

Bimetal strip the high-expansion element of which is an alloy which, in weight percent (w/o), consists essentially of up to about 0.50 w/o carbon, about 15-50 w/o manganese, up to about 2 w/o silicon, up to about 12 w/o chromium, about 10-35 w/o nickel, up to about 10 w/o cobalt and the balance iron except for incidental amounts of other elements which may include up to about 0.04 w/o phosphorus, up to about 0.04 w/o sulfur as well as other elements which do not significantly detract from the desired properties or result in the formation of ferrite or otherwise render the desired room temperature austenitic structure of the alloy unstable so as to significantly reduce the coefficient of thermal expansion.

10 Claims, No Drawings

STABLE BIMETAL STRIP

RELATED APPLICATIONS

This application is a continuation of application Ser. No. 873,619 filed by Earl L. Frantz on Jan. 30, 1978 and now abandoned.

BACKGROUND OF THE INVENTION

This invention relates to bimetal strip the highexpansion element of which is an austenitic alloy having a unique combination of thermal expansion and electrical resistivity properties with good forming and weldability properties.

Austenitic alloys characterized by relatively high thermal expansivity and electrical resistivity have hitherto been provided for use in bimetal strip in thermally responsive control devices. One such iron base alloy has a nominal composition of 22 weight percent (w/o) nickel, 3 w/o chromium and the balance iron. That alloy is characterized by a temperature coefficient of expansion of about $10 \times 10^{-6}$/°F. ($18 \times 10^{-6}$/°C.) and an electrical resistivity of about 460 ohms cir mil/ft (76 microhms-cm). The alloy is balanced so as to provide an austenitic, face centered cubic (F.C.C.), structure at room temperature having sufficient ductility for manufacturing purposes. However, a serious drawback resides in that when the alloy is cold worked to as much as 70% reduction and above, it results in the formation of ferrite, body centered cubic (B.C.C.), which significantly lowers the alloy's thermal expansivity. Inhomogeneities, with or without cold working, can have a similar adverse effect. Another alloy which is also in demand because of its relatively high thermal expansivity has a nominal composition of 15 w/o nickel, 10 w/o manganese, 5 w/o aluminum and the balance iron. This alloy has a temperature coefficient of expansion of about $9 \times 10^{-6}$/°F. ($16.2 \times 10^{-6}$/°C.) and an electrical resistivity of about 640 ohms cir mil/ft (106 microhms-cm). Unfortunately, this alloy because of its composition is difficult to bond with other metals and when cold worked tends to rapidly become work hardened.

BRIEF SUMMARY OF THE INVENTION

It is, therefore, a principal object of this invention to provide bimetal strip the high-expansion element of which is an alloy containing iron, manganese and nickel which is austenitic even when subjected to servere cold working and has high thermal expansivity and electrical resistivity combined with good formability and good weldability.

A further object of this invention is to provide such bimetal strip in which the high expansion material is bonded or welded in face-to-face relation, to a relatively low expansion metal strip.

In accordance with the present invention, bimetal strip is provided in which the high-expansion element is an alloy which, in weight percent (w/o), consists essentially of up to about 0.50 w/o carbon, about 15-50 w/o manganese, up to about 2 w/o silicon, up to about 12 w/o chromium, about 10-35 w/o nickel, up to about 10 w/o cobalt and the balance iron except for incidental amounts of other elements which may include up to about 0.04 w/o phosphorus, up to about 0.04 w/o sulfur as well as other elements which do not significantly detract from the desired properties o result in the formation of ferrite or otherwise render the desired room temperature austenitic structure of the alloy unstable so as to significantly reduce the coefficient of thermal expansion.

DETAILED DESCRIPTION

In the high-expansion element of the bimetal strip of this invention, manganese and nickel work together to ensure a stable, austenitic alloy which remains free from the formation of detrimental ferrite even when subjected to 90% cold reduction. By stabilizing the austenitic F.C.C. field, manganese and, even more so, nickel contribute to the high coefficient of thermal expansion characteristic of this alloy. To that end, a minimum of about 15 w/o manganese and 10 w/o, preferably 15 w/o, nickel is present in this composition. Increasing manganese and/or nickel above those amounts produces higher electrical resistivity. To ensure an electrical resistivity of more than 500 ohms cir mil/ft (83 microhms-cm), the combined amount of manganese and nickel should be at least about 32%, and, with a combined manganese and nickel content of at least about 60 w/o, a resistivity of 725 ohms cir mil/ft (120 microhms-cm) is provided. In accordance with one aspect of this invention, the proportions of manganese and nickel are balanced so that the ratio of the weight percent of manganese to the weight percent of nickel is less than 2 (Mn/Ni <2), and to ensure a minimum coefficient of thermal expansion from room temperature to about 300° F. (149° C.) of $10 \times 10^{-6}$/°F. ($18 \times 10^{-6}$/°C.), the ratio of the amounts of manganese and nickel present is preferably maintained less than 1.6 (Mn/Ni <1.6).

Carbon is not considered to be an essential constituent of this composition although at least about 0.001 w/o will usually be present, and as much as 0.50 w/o can be tolerated as long as the resulting hardness, particularly in the annealed condition is tolerable. However, to avoid excessive hardness, carbon is limited to no more than about 0.3 w/o and preferably to no more than 0.15 w/o. Because carbon is a very powerful stabilizer of austenite, thirty times or more as effective than nickel, some carbon is beneficially used for that purpose, particularly when the smaller amounts, less than about 15 w/o nickel are present. While nitrogen is preferably not added to this composition, some nitrogen may be used in place of carbon (on a one-for-one basis) for stabilizing austenite, but, as in the case of carbon, excessive amounts are to be avoided when the accompanying increase in hardness cannot be tolerated.

Other optional additions including chromium and cobalt in amounts which do not tend to destabilize the austenitic structure of the composition or objectionably detract from its required properties may be present. Depending upon the balance of the composition, as much as 8 w/o or 12 w/o or more chromium and as much as about 10 w/o cobalt may be present.

In melting the composition, silicon is the preferred deoxidizer, and, when used for that purpose, up to about 2 w/o, preferably no more than about 1 w/o, may be present in the composition. Other incidental elements include phosphorus and sulfur which are preferably kept low, but not more than 0.04 w/o of either being present. And, as has been pointed out hereinabove, the balance of the composition is iron except for incidental amounts of other elements which do not significantly detract from the desired properties of the composition or significantly reduce its coefficient of thermal expansion.

The composition is readily prepared using conventional metallurgical techniques, melting under vacuum being preferred. The alloy is readily hot and cold worked. A suitable temperature for forging is about 2000° F. (about 1100° C.). For cold working, the material is annealed with intermediate annealing as required. The particular temperature and duration of the annealing treatment will depend upon the cross section of the material. For example, with dilatometer specimens 0.25 inch in diameter, annealing was preferably carried out at 1600° F. (871° C.) for 1 hour followed by cooling in air.

Examples 1-21, were melted under vacuum as relatively small, experimental heats having the composition, in weight percent, shown in Table I, the balance in each case being iron and incidental impurities which included less than 0.01 w/o phosphorus, and less than 0.015 w/o sulfur. Examples 1-21 were substantially free of chromium, that is, no more than about 0.5 w/o.

TABLE I

| Ex. No. | C | Mn | Si | Ni | Co |
|---|---|---|---|---|---|
| 1 | .081 | 19.03 | .14 | 20.02 | 4.99 |
| 2 | .083 | 23.41 | .17 | 20.05 | 4.95 |
| 3 | .084 | 28.16 | .18 | 10.32 | 10.27 |
| 4 | .085 | 33.44 | .18 | 10.15 | 10.27 |
| 5 | .088 | 14.95 | .10 | 25.08 | <.01 |
| 6 | .086 | 19.74 | .10 | 15.26 | <.01 |
| 7 | .090 | 14.91 | .10 | 15.05 | 2.43 |
| 8 | .087 | 14.95 | .11 | 20.11 | 4.87 |
| 9 | .085 | 19.82 | .10 | 20.13 | 2.46 |
| 10 | .081 | 19.71 | .12 | 25.03 | 4.97 |
| 11 | .086 | 24.69 | .12 | 15.35 | 4.94 |
| 12 | .075 | 24.71 | .11 | 20.19 | .04 |
| 13 | .087 | 24.93 | .12 | 25.02 | 2.42 |
| 14 | .071 | 24.81 | .27 | 25.02 | — |
| 15 | .001 | 14.82 | .03 | 24.92 | — |
| 16 | .001 | 22.39 | .03 | 25.04 | — |
| 17 | .001 | 24.22 | .06 | 15.28 | — |
| 18 | .001 | 24.50 | .06 | 24.04 | — |
| 19 | .001 | 33.46 | .06 | 15.16 | — |
| 20 | .001 | 33.21 | .06 | 23.16 | — |
| 21 | .002 | 24.93 | .04 | 35.34 | — |

The heats were cast into ingots which were forged and hot rolled from a furnace temperature of 1950° F. (1065° C.) to provide strip 0.125 in (0.32 cm) thick. Dilatometer specimens 4 in×0.25 in×0.125 in (10.16 cm×0.64 cm×0.32 cm) were prepared of each example, and their coefficients of thermal expansion were determined using a quartz system dilatometer. The coefficients from 75° F. (24° C.) to 300° F. (149° C.) are listed in Table II. The 0.125 in strip formed as just described was cold rolled to 0.030 in (0.076 mm), annealed, and then electrical resistivity was determined with a Kelvin Bridge, the results being also given in Table II. Annealing was carried out at 1550° F. (843° C.) for one hour followed by cooling in air.

TABLE II

| Ex. No. | Expansion Coefficient $10^{-6}/°F.$ | $(10^{-6}/°C.)$ | Resistivity ohms cir mil/ft (microhms-cm) |
|---|---|---|---|
| 1 | 10.79 | (19.42) | 593 (98.6) |
| 2 | 10.58 | (19.04) | 620 (103.1) |
| 3 | 9.66 | (17.39) | 575 (95.6) |
| 4 | 9.19 | (16.54) | 614 (102.1) |
| 5 | 10.91 | (19.64) | 567 (94.3) |
| 6 | 10.63 | (19.13) | 527 (87.6) |
| 7 | 10.84 | (19.51) | 496 (82.5) |
| 8 | 10.59 | (19.06) | 535 (88.9) |
| 9 | 10.88 | (19.58) | 552 (91.8) |
| 10 | 10.56 | (19.01) | 603 (100.2) |
| 11 | 10.59 | (19.06) | 569 (94.6) |
| 12 | 10.63 | (19.13) | 610 (101.4) |
| 13 | 10.80 | (19.44) | 654 (108.7) |
| 14 | 10.76 | (19.37) | 649 (107.9) |
| 15 | 10.71 | (19.28) | 552 (91.8) |
| 16 | 10.76 | (19.37) | 623 (103.6) |
| 17 | 10.27 | (18.49) | 546 (90.8) |
| 18 | 10.84 | (19.51) | 627 (104.2) |
| 19 | 9.55 | (17.19) | 629 (104.6) |
| 20 | 10.89 | (19.60) | 711 (118.2) |
| 21 | 10.49 | (18.88) | 729 (121.2) |

Hardnesses were measured in both the annealed and cold rolled condition, with the results being indicated in Table III on the Rockwell B ($R_b$) scale for the annealed condition and on the Rockwell C ($R_c$) scale for the cold rolled condition. Specimens of Example 1-4 were subjected to about 88% cold reduction. Examples 14, 16, 18, 19, 20 and 21 were cold rolled about 60%.

TABLE III

| Ex. No. | Annealed ($R_b$) | Cold Rolled ($R_c$) |
|---|---|---|
| 1 | 68 | 34 |
| 2 | 69 | 35 |
| 3 | 68 | 43 |
| 4 | 69 | 43 |
| 14 | 72 | 25 |
| 16 | 62 | 23 |
| 18 | 65 | 22 |
| 19 | 66 | 23 |
| 20 | 72 | 22 |
| 21 | 70 | 21 |

Specimens of Examples 5-13 were examined using a light microscope and were found to have a uniform grain size of about ASTM 7 to 8 in the forged condition. When subjected to X-ray diffraction analysis, specimens of Examples 5-13 were found to have a single phase, austenitic structure.

A composition which had outstanding properties had a nominal composition of 34 w/o manganese, 21 w/o nickel and the balance iron plus incidental amounts of other elements which included about 0.05 w/o carbon and 0.25 w/o silicon. The electrical resistivity of this material was found to be 675 ohms cir mil/ft (112.2 microhms-cm). The coefficient of thermal expansion from 75° F. (24° C.) to 200° F. (93° C.) was $9.71 \times 10^{-6}/°F.$ ($17.48 \times 10^{-6}/°C.$), from 75° F. to 300° F. (149° C.) it was $10.39 \times 10^{-6}/°F.$ ($18.70 \times 10^{-6}/°C.$) from 75° F. to 500° F. (260° C.) it was $11.21 \times 10^{-6}/°F.$ ($20.18 \times 10^{-6}/°C.$), and from 75° F. to 700° F. (371° C.) it was $11.89 \times 10^{-6}/°F.$ ($21.40 \times 10^{-6}/°C.$). When bonding this material by pressure welding to a low expansion material (36 w/o nickel, balance iron) as would be done in forming the bimetal of a thermostat, an adherent metallic bond is readily formed. When examined metallorgraphically, the material is found to be austenitic after about 80% cold reduction, as would also be expected after as much as 90% cold reduction.

It is to be noted it is not intended by referring to broader and narrower ranges or by designating broader and preferred quantities of certain of the elements to thereby limit the composition so as to exclude the possibility of using the preferred amounts of one or more elements with the broader or larger amounts of other elements. For example, it is intended that the broad, intermediate or narrowest range of carbon can be used with the broad or narrower range of nickel.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A thermally responsive device comprising a low-expansion metal strip bonded or welded in face-to-face relation to a high-expansion material formed from an austenitic alloy having high thermal expansion and high electrical resistance combined with good forming and weldability properties, said alloy, in weight percent, consists essentially of about

|  | w/o |
|---|---|
| Carbon | up to 0.50 |
| Manganese | 15–50 |
| Silicon | up to 2 |
| Phosphorus | up to 0.04 |
| Sulfur | up to 0.04 |
| Nickel | 10–35 |

-continued

|  | w/o |
|---|---|
| Cobalt | up to 10 | and the balance essentially iron substantially free of chromium.

2. Bimetal strip as set forth in claim 1 in which said alloy contains up to about 0.3% carbon.

3. Bimetal strip as set forth in claim 1 in which said alloy contains up to about 0.15% carbon.

4. Bimetal strip as set forth in claim 1 in which said alloy contains at least about 15% nickel.

5. Bimetal strip as set forth in claim 4 in which said alloy contains no more than about 35% manganese.

6. Bimetal strip as set forth in claim 5 in which the combined amount of manganese plus nickel in said alloy is at least about 32%.

7. Bimetal strip as set forth in claim 5 in which the combined amount of manganese plus nickel in said alloy is at least about 60%.

8. Bimetal strip as set forth in claim 5 in which said alloy contains no more than an incidental amount of cobalt, and no more than about 0.15% carbon.

9. Bimetal strip as set forth in claim 5 in which the ratio of the amount of manganese and the amount of nickel in said alloy is less than two.

10. Bimetal strip as set forth in claim 9 in which said ratio is equal to or less than 1.6.

* * * * *